US007000980B2

United States Patent
Lutz et al.

(10) Patent No.: US 7,000,980 B2
(45) Date of Patent: Feb. 21, 2006

(54) ROOF COMPONENT, IN PARTICULAR AN INNER LINER FOR A VEHICLE ROOF, AND A METHOD OF PRODUCING SAME

(75) Inventors: Markus Lutz, Gifhorn (DE); Joachim Röder, Mühlheim (DE); Frank Niebuhr, Gifhorn (DE); Kai Stehning, Usingen (DE)

(73) Assignee: ArvinMeritor GmbH, Dietzenbach (DE)

( * ) Notice: Subject to any disclaimer, the term of this patent is extended or adjusted under 35 U.S.C. 154(b) by 78 days.

(21) Appl. No.: 10/254,266

(22) Filed: Sep. 25, 2002

(65) Prior Publication Data

US 2003/0057739 A1 Mar. 27, 2003

(30) Foreign Application Priority Data

Sep. 26, 2001 (DE) .......................................... 101 47 327

(51) Int. Cl.
*B60R 13/01* (2006.01)

(52) U.S. Cl. ...................................... 296/214; 296/210
(58) Field of Classification Search ................ 296/214, 296/39.1, 210
See application file for complete search history.

(56) References Cited

U.S. PATENT DOCUMENTS

| 1,753,397 | A | * | 4/1930 | Woodall et al. ................ 52/222 |
| 5,120,593 | A | * | 6/1992 | Kurihara ....................... 296/210 |
| 5,941,590 | A | * | 8/1999 | Reynolds et al. ........... 296/39.1 |
| 5,975,625 | A | | 11/1999 | Simplicean |
| 6,070,902 | A | * | 6/2000 | Kowalski et al. ........... 296/214 |
| 6,343,831 | B1 | * | 2/2002 | Nabert et al. ................ 296/214 |
| 6,378,936 | B1 | * | 4/2002 | Grimm et al. ............... 296/214 |
| 6,619,731 | B1 | * | 9/2003 | Rieger et al. ................ 296/214 |
| 2002/0167203 | A1 | * | 11/2002 | Rieger et al. ................ 296/214 |

FOREIGN PATENT DOCUMENTS

| DE | 199 47 238 A1 | | 4/2001 |
| EP | 0248240 | * | 12/1987 |
| EP | 0 306 923 A2 | | 3/1989 |

OTHER PUBLICATIONS

European Search Report, dated May 22, 2003.
German Search Report, dated Dec. 12, 2003.

* cited by examiner

*Primary Examiner*—H. Gutman
(74) *Attorney, Agent, or Firm*—Carlson, Gaskey & Olds

(57) ABSTRACT

A roof component, in particular an inner liner for a vehicle roof, comprises a carrier layer which consists of a cured material, and a mounting structure. The mounting structure is formed by at least one undercut. There is further proposed a method of producing such a roof component, comprising the following steps: first, a forming tool is provided which consists of a first and a second tool part, an elastically deformable body provided on the first tool part being capable of being deformed between an initial position in which it is extended in a direction perpendicular to a general direction of extension of the roof component, and a working position in which it forms at least one protrusion which extends in parallelism to the general direction of extension of the roof component and at a distance from the first tool part; next, a curable material is introduced into the forming tool, the curable material curing to form the carrier layer while the deformable body is in the working position, such that the protrusion formed by the body is imparted to the carrier layer so as to form an undercut; subsequently, the forming tool is opened and the deformable body is transferred to the initial position, so that it frees the undercut in the carrier layer; finally, the roof component is taken out of the forming tool.

8 Claims, 9 Drawing Sheets

ROOF COMPONENT, IN PARTICULAR AN INNER LINER FOR A VEHICLE ROOF, AND A METHOD OF PRODUCING SAME

This application claims priority to German Patent Application Number 10147327.3 filed on Sep. 26, 2001.

BACKGROUND OF THE INVENTION

The invention relates to a roof component, in particular an inner liner for a vehicle roof, as well as to a method of producing such a roof component.

Conventional roof components comprise a carrier layer which consists of a cured material, and a mounting structure. The mounting structure may serve for fastening e.g. the inner liner of the vehicle to the roof component. In case the roof component is the inner liner of the vehicle, the mounting structure may serve for fastening it to the vehicle roof. The mounting structure may also serve for fastening further components to the inner liner, for instance a guide rail for a sliding roof. Hitherto, the mounting structure has always consisted in separate fasteners such as clamps, frames or the like, which have been fastened to the carrier layer either subsequently or have been embedded therein during the manufacture of the carrier layer. A disadvantage in such process is the high expenditure both for producing and providing the separate fasteners and for attaching them to the inner liner.

Therefore it is the object of the invention to provide a roof component which can be installed with a small expenditure with respect to further fasteners or which makes it possible to mount further components to it.

BRIEF SUMMARY OF THE INVENTION

According to the invention, a roof component comprises a carrier layer which consists of a cured material, and a mounting structure. The mounting structure is formed by at least one undercut. Such an undercut—which may be shaped in particular in the nature of a groove—allows other components to be fastened to the roof component without the use of interposed fasteners, or to attach the roof component itself. The invention is based on the knowledge that such an undercut can be produced with an extremely small expenditure, if the forming tool used for producing the carrier layer has an appropriate configuration. For this, no sliders or the like are required, which hitherto have been necessary in prior art for producing the undercut and which, due to the high expenditure associated with them, have had the effect that the specialist's circles have not considered to provide an undercut on a roof component.

According to one embodiment of the invention it is provided for that the carrier layer has an opening and the groove extends around the opening. The surrounding nut can be used for a safe attachment of a component inserted in the opening.

The groove may also extend along the rim of the carrier part. It is in this way that the rim of the carrier part can be anchored with minimum expenditure on a guide rail of a sliding roof, for instance.

There may also be provided two opposing undercuts that are spaced from each other by a distance and are parallel to each other. A rail may be pushed into the two undercuts lying opposite each other, which then is safely anchored on the carrier layer without any further measures.

According to an embodiment of the invention it is provided for that a decorative layer is applied on the carrier layer, this decorative layer extending across the undercut. Thereby it is ensured that the end of the decorative layer is not visible, because it is concealed by the component engaging the undercut.

According to an embodiment the decorative layer, adjacent to the undercut, has cut edge which is free from material of the carrier layer. Such a neat cut edge may be obtained in that the decorative layer is cut off in the region of the undercut not until the carrier layer has been produced. During the curing process of the carrier layer, the decorative layer extends into the tool gap between two tool parts of the forming tool, where it may serve for sealing.

The object indicated above is solved by a method of producing a roof component, in particular an inner liner for a vehicle roof, by means of the following steps: first, a forming tool is provided which consists of a first and a second tool part, an elastically deformable body provided on the first tool part being capable of being deformed between an initial position in which it is extended in a direction perpendicular to a general direction of extension of the roof component, and a working position in which it forms at least one protrusion which extends in parallelism to the general direction of extension of the roof component and at a distance from the first tool part; next, a curable material is introduced into the forming tool, the curable material curing to form the carrier layer while the deformable body is in the working position, such that the protrusion formed by the body is imparted to the carrier layer so as to form an undercut; subsequently, the forming tool is opened and the deformable body is transferred to the initial position, so that it frees the undercut in the carrier layer; finally, the roof component is taken out of the forming tool. It is by means of the deformable body that the undercut can be realized in the carrier layer with low expenditure. The forming tool has a simple and, hence, low-cost construction, this finding expression in low piece costs for the roof component.

During closing the forming tool, the deformable body is preferably automatically transferred to the working position by the body resting against the second tool part. In this embodiment no external operating devices are necessary for the elastically deformable body, which leads to particularly low costs. Moreover, the elastic body makes it possible without further expenditure to realize a through-hole in the carrier layer.

As an alternative there may be provided for that during closing the forming tool the deformable body is transferred by an operating device from the initial position to the working position, so that it is spaced from the second tool part when the forming tool is in the closed state. This embodiment is particularly of advantage in case the elastically deformable body is not intended to make a through-opening in the carrier layer.

The deformable body consists preferably of rubber and is filled with a pressure fluid. In this way the elastic deformability of the body is maintained, whilst a compression resistance existing at the same time.

According to the preferred embodiment it is provided for that a decorative layer is inserted in the opened forming tool, a curable material is applied on said decorative layer which foams up during the curing process, and that the forming tool is closed subsequently. In this way the decorative layer is directly connected with the carrier layer, the carrier layer having a comparably low weight due to the foaming process.

Advantageous embodiments will be apparent from the sub-claims.

In the context of this specification, the term "roof component" means an inner liner for a vehicle roof. The invention, however, may also be applied to other roof components.

DETAILED DESCRIPTION OF THE PREFERRED EMBODIMENTS

Figures 1, 2:
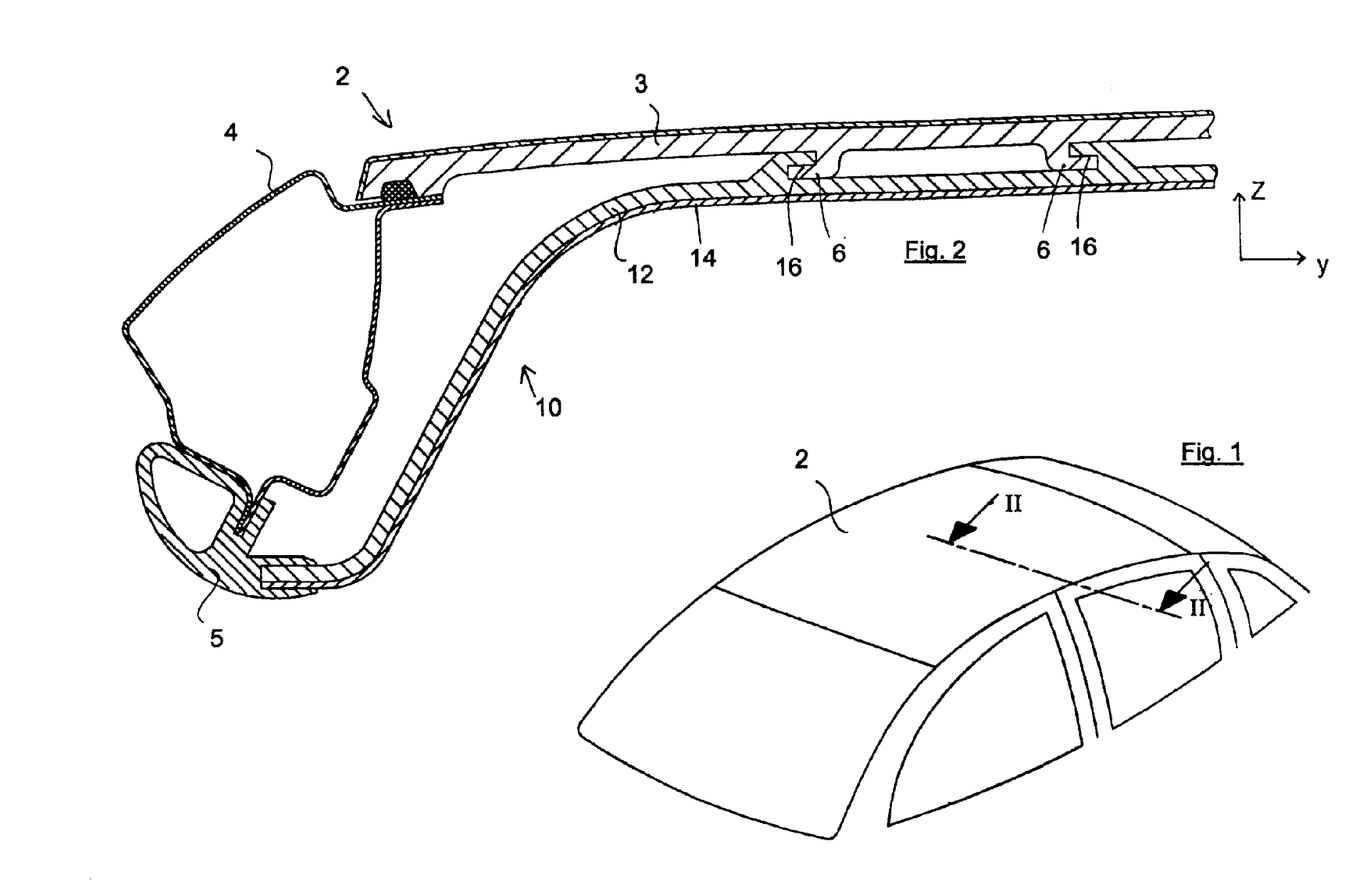
FIG. 1 shows in a schematic perspective view a vehicle roof.
FIG. 2 is a sectional view along plane II—II of FIG. 1, showing an inner liner according to a first embodiment.

In FIG. 1 there can be seen a vehicle roof 2, the structure of which will be apparent in detail from FIG. 2. The vehicle roof 2 has an outer shell 3 which is connected to a longitudinal beam 4 of a vehicle body. Attached to the longitudinal beam 4 is a sealing profile 5, a rim of an inner liner 10 being inserted therein. The inner liner consists of a carrier layer 12 and a decorative layer 14. The carrier layer 12 consists of a cured plastics material which has been foamed prior to curing, where appropriate. The decorative layer 14 consists of a fleece, for instance, and is firmly connected with the carrier layer 12. The decorative layer 14 is that part of the inner liner which is visible for a vehicle occupant.

The inner liner 10 and, to be more precise, the carrier layer 12 is connected with the outer shell 3 of the vehicle roof 2 by several undercuts 16 which are configured in the nature of a groove and engage in the holding projections 6 of the outer shell 3. The grooves formed by the undercuts 16 have a bottom which extends approximately perpendicularly to the direction of extension of the carrier layer 12, and two side surfaces arranged opposite each other which extend approximately in parallelism to the direction of extension of the carrier layer. Due to the arrangement of the undercuts and the use of two undercuts opposing each other, the inner liner 10 is fastened to the outer shell 3 of the vehicle roof 2 both in the z-direction and the y-direction of the vehicle, without the need of using separate fasteners. Moreover, the undercuts 16 form holding surfaces that are generally parallel to the carrier layer 12, thereby resisting forces that are perpendicular to the carrier layer 12.

Figures 3, 4:
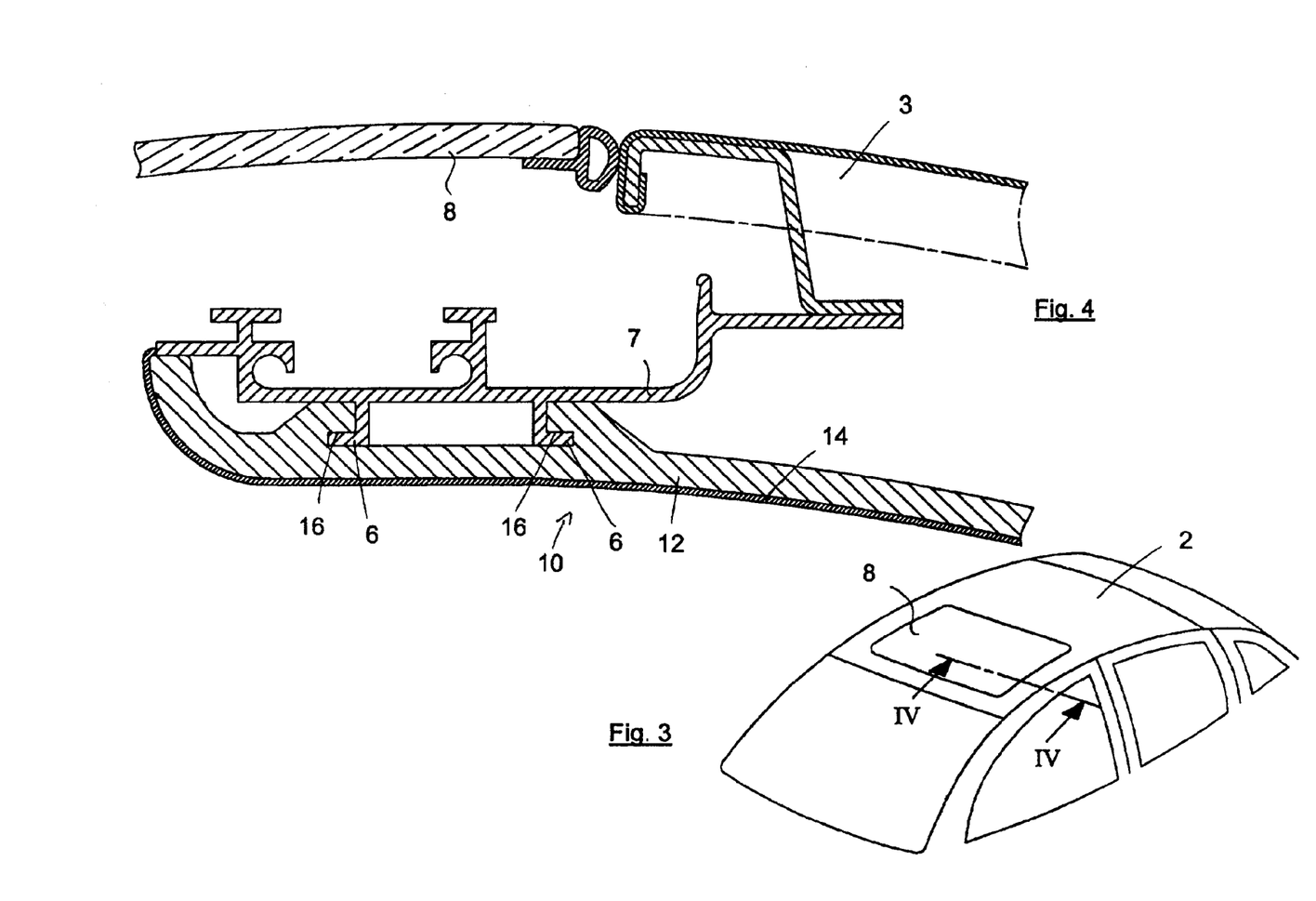
FIG. 3 shows in a schematic, perspective view a further vehicle roof.
FIG. 4 is a sectional view along plane IV—IV of FIG. 3, showing an inner liner according to a second embodiment.

In FIGS. 3 and 4 there is shown a vehicle roof including an inner liner according to a second embodiment. There will be used the same reference numerals for those components which are known from the first embodiment shown in FIGS. 1 and 2, and reference is made to the explanations made above.

Unlike the first embodiment, the two undercuts 16 in the second embodiment cooperate with a guiding rail 7 which is part of a sliding roof system that has a movable cover 8.

The production of the inner liner 10 will be explained in the following by means of the FIGS. 5 to 7. The inner liner 10 is produced in a forming tool, a first tool part 30 as well a second tool part 32 being schematically shown in FIGS. 5 to 7. The two tool parts can be moved relative to each other along a direction P between an open state shown in FIGS. 5 and 7, and a closed state shown in FIG. 6.

An elastically deformable body 34 is attached to the first tool part 30 on the side of the forming cavity of the forming tool. This body consists of rubber and its interior is filled with a pressure fluid 35. A bar 36 extends right through the interior of the body 34, this bar also crossing the first tool part 30 up to the outer side of the forming tool. Provided on the outer side is a compression spring 38 which strives to force the bar 36 out of the tool part 30, as well as a schematically indicated operating device B which counteracts the compression spring 38. In the position of rest and with no external forces acting on it, the body has a preformed shape (shown in FIG. 6) with a rectangular cross-section, in which the body has a specific inherent stability. In the initial position of the forming tool shown in FIG. 5, the operating device B pushes the bar 36 into the forming cavity such that the elastically deformable body 34 is extended in the direction P, i.e. approximately perpendicularly to the direction of extension of the forming cavity. In so doing, it has a substantially rhombic shape. A shoulder 40 is configured on the first tool part 30 and around the bar 36; the function of this shoulder will be explained below.

For producing the inner liner 10, firstly the decorative layer 14 is spread out flat on the lower tool part 32. Next, a curable material is applied on the decorative layer 14 and the forming tool is closed. At the same time, the operating device B releases the bar 36, so that the body 34 retracts into its oblate position of rest (see FIG. 6) which corresponds to the working position of the forming tool. In the working position, the body 34 has a substantially rectangular cross-section and projects with its outer rim beyond the shoulder 40, so that at this place the material of the carrier layer is given the shape of a projecting nose 18 and undercuts are formed.

The curable material filled into the forming tool combines with the decorative layer 14 and is cured. The undercuts 16 formed thereby are provided with rounded inner edges, because their shape is determined by the body 34 which is pliant to some extent. This is no disadvantage, however, because the sharp edges in the region of the undercuts 16, which can be obtained with the use of sliders, are not required. Even so it is possible to realize the body 34 with outer edges that are more sharply rounded as is illustrated in the Figures.

When the forming tool is opened (see FIG. 7), the bar 36 is again forced into the forming cavity by means of the operating device B, so that the elastically deformable body 34 is again returned from its extended working position parallel to the direction of extension of the forming cavity into its initial position. In so doing, the body 34 is pulled out from under the noses 18, so that the ready-formed inner liner 10 is freed and can be taken out of the forming tool.

Figure 7:
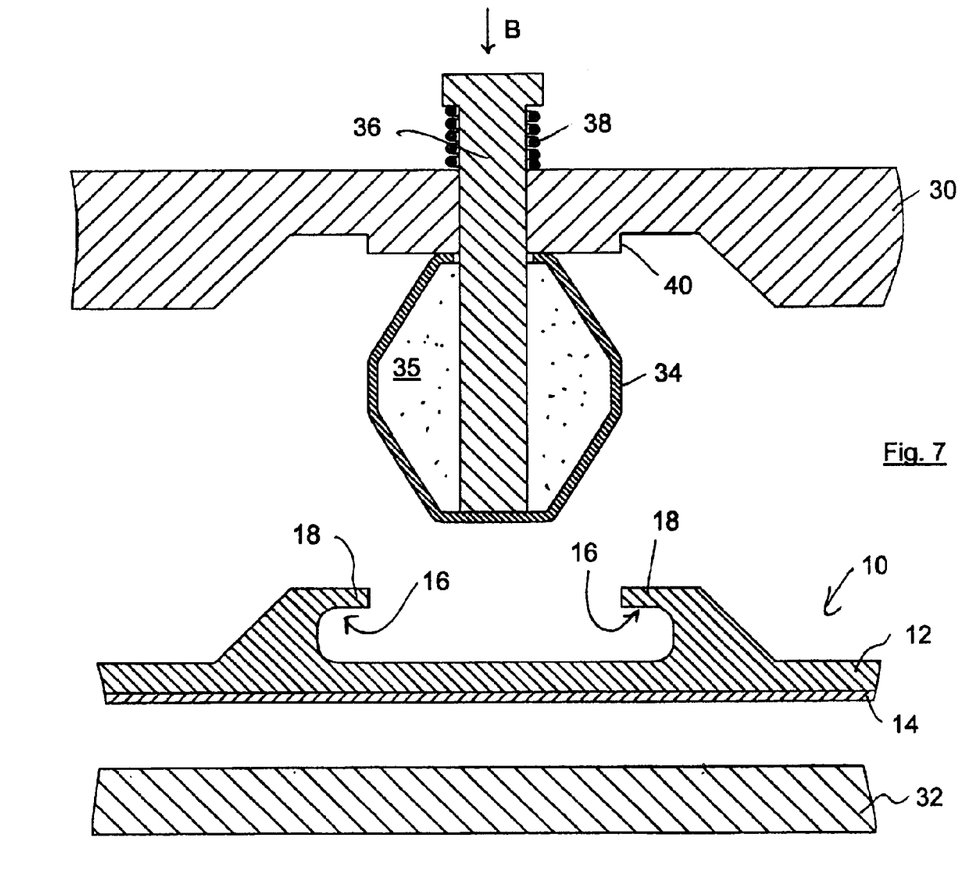
FIG. 7 shows the forming tool of FIG. 6 again in the open state, the inner liner having been produced.
Figure 8:
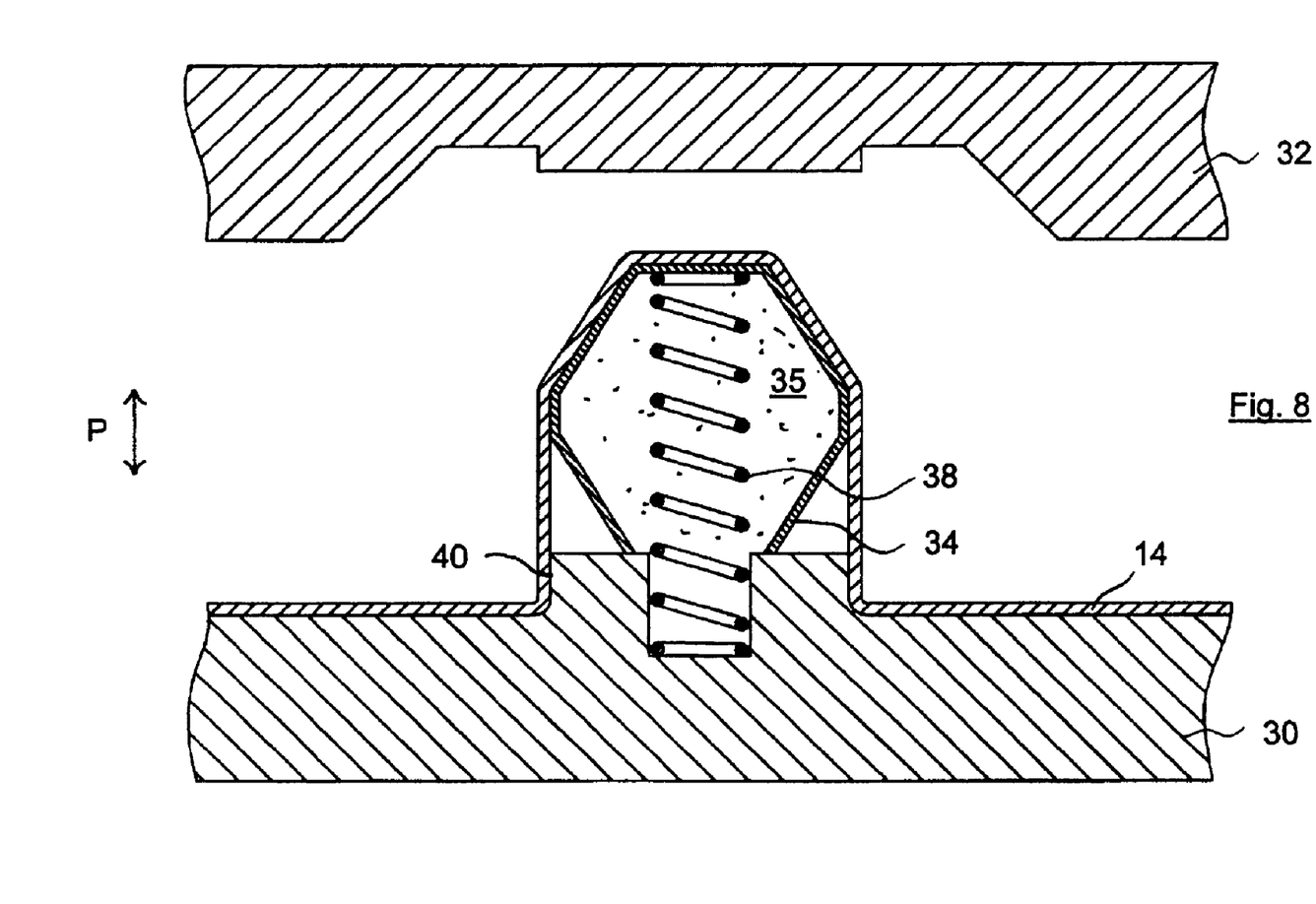
FIG. 8 shows a further forming tool in a view corresponding to that of FIG. 5.
Figure 9:
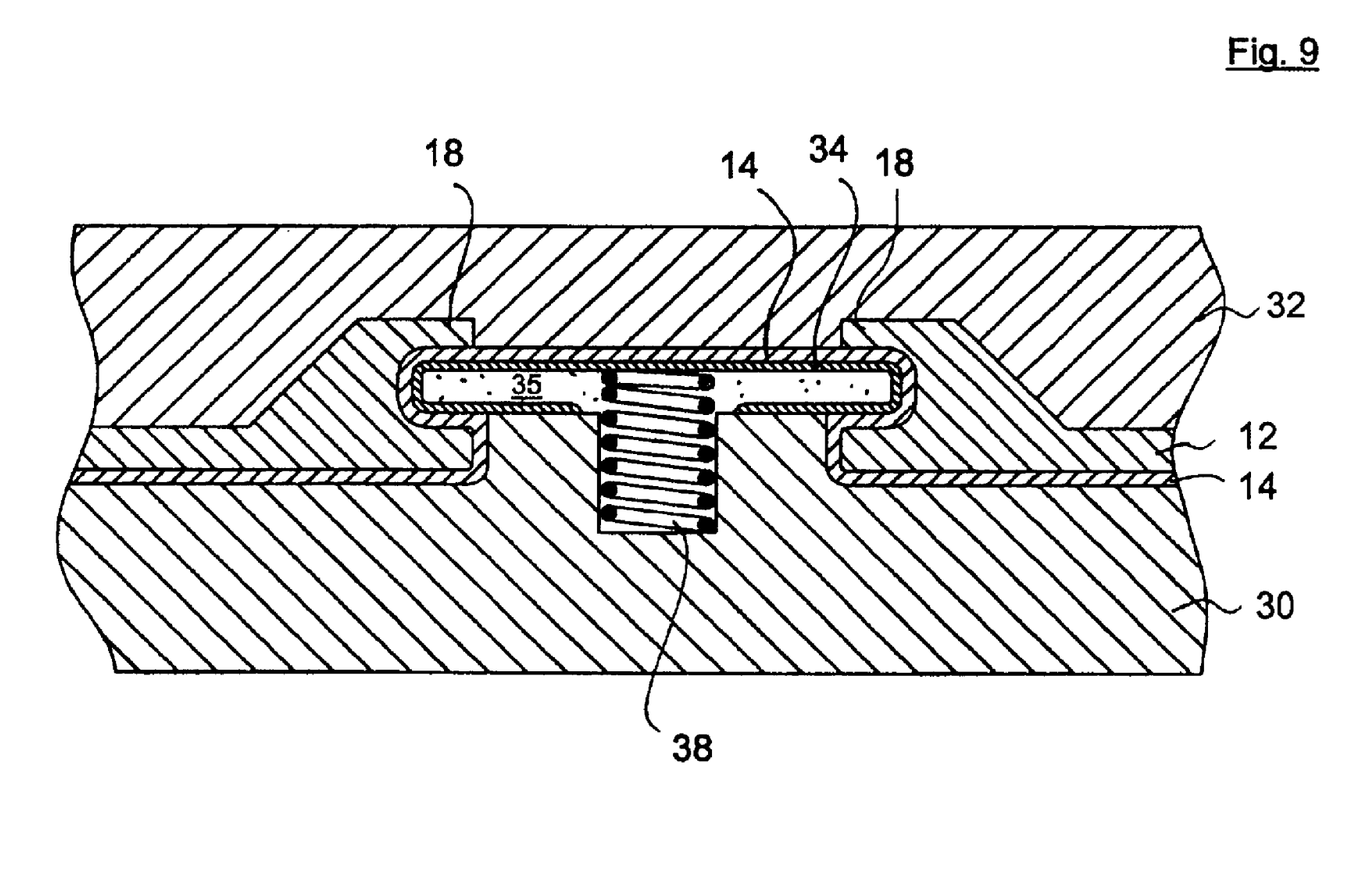
FIG. 9 shows the forming tool of FIG. 8 in the closed state, a carrier layer being formed.
Figure 10:
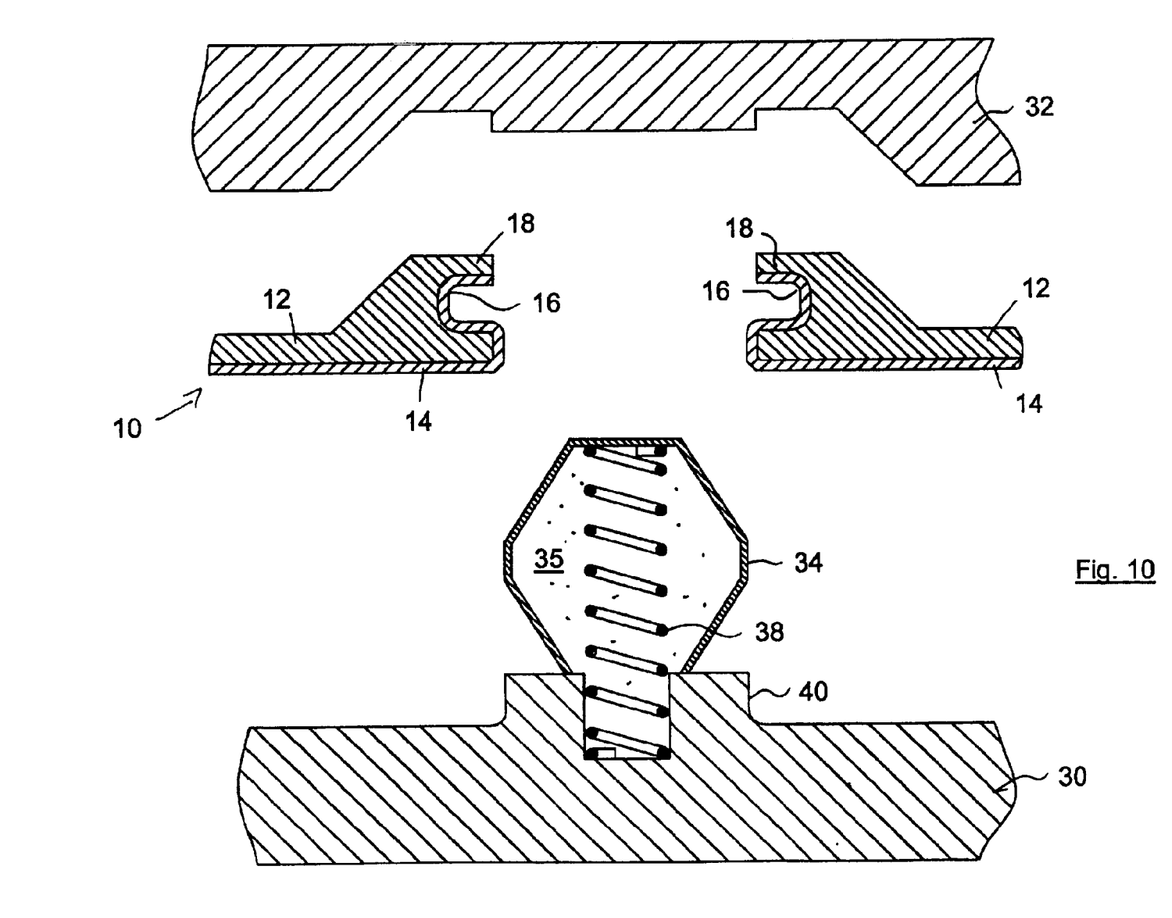
FIG. 10 shows the forming tool of FIG. 9 in the re-opened state, with the inner liner having been produced.

In FIGS. 8 to 10 there is shown an alternative design of the forming tool by means of which an inner liner can be produced with a through-opening that is provided with the undercut 16 on the edge thereof. The most substantial difference to the forming tool shown in FIGS. 5 to 7 is that the bar 36 and the operating device B are not required in order to transfer the elastically deformable body 34 from its initial position shown in FIGS. 8 and 10 to the working position shown in FIG. 9. As a through-opening is to be produced in the inner liner 10, the elastically deformable body 34 comes to rest against the second tool part 32 on closing the forming tool, this second tool part urging the body from the initial position into the working position.

Figure 5:
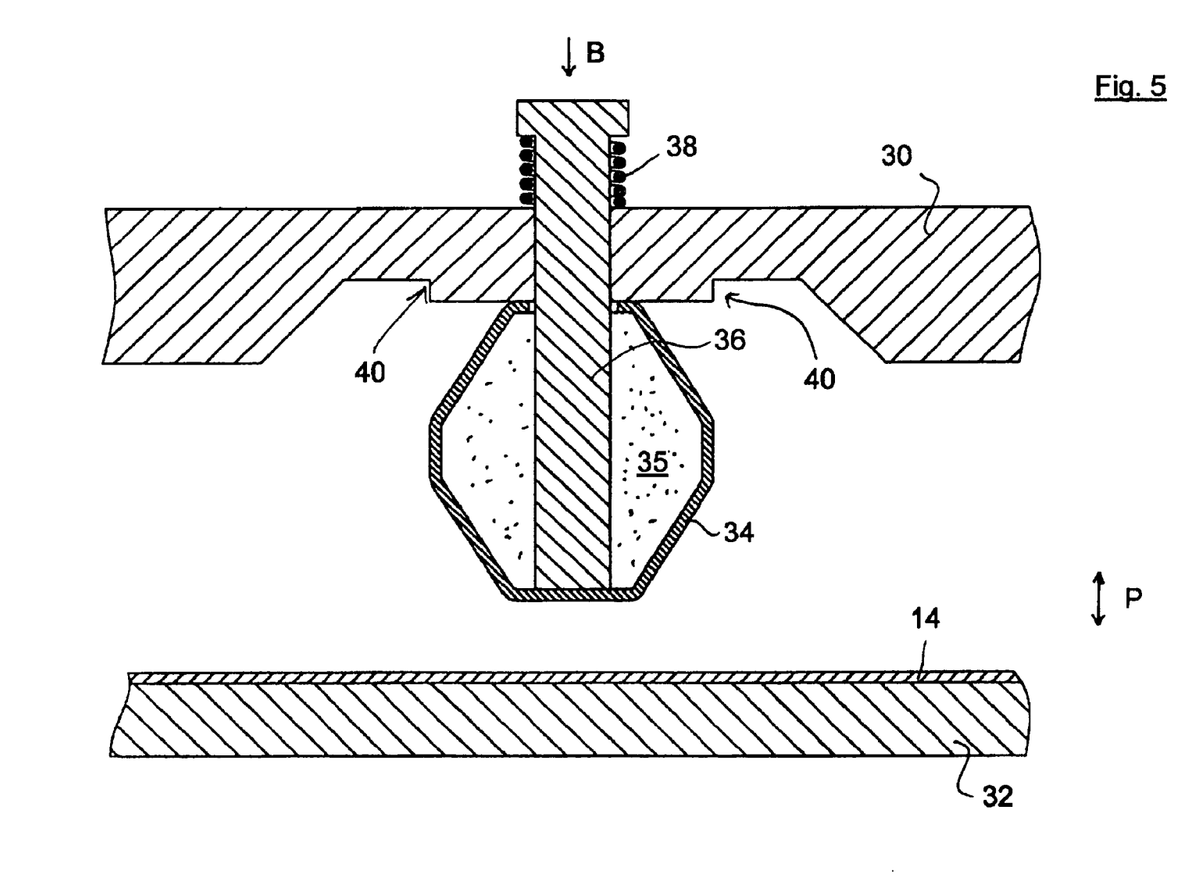
FIG. 5 shows in a schematic, broken view a forming tool in the open state, which may be used for producing an inner liner.
Figure 6:
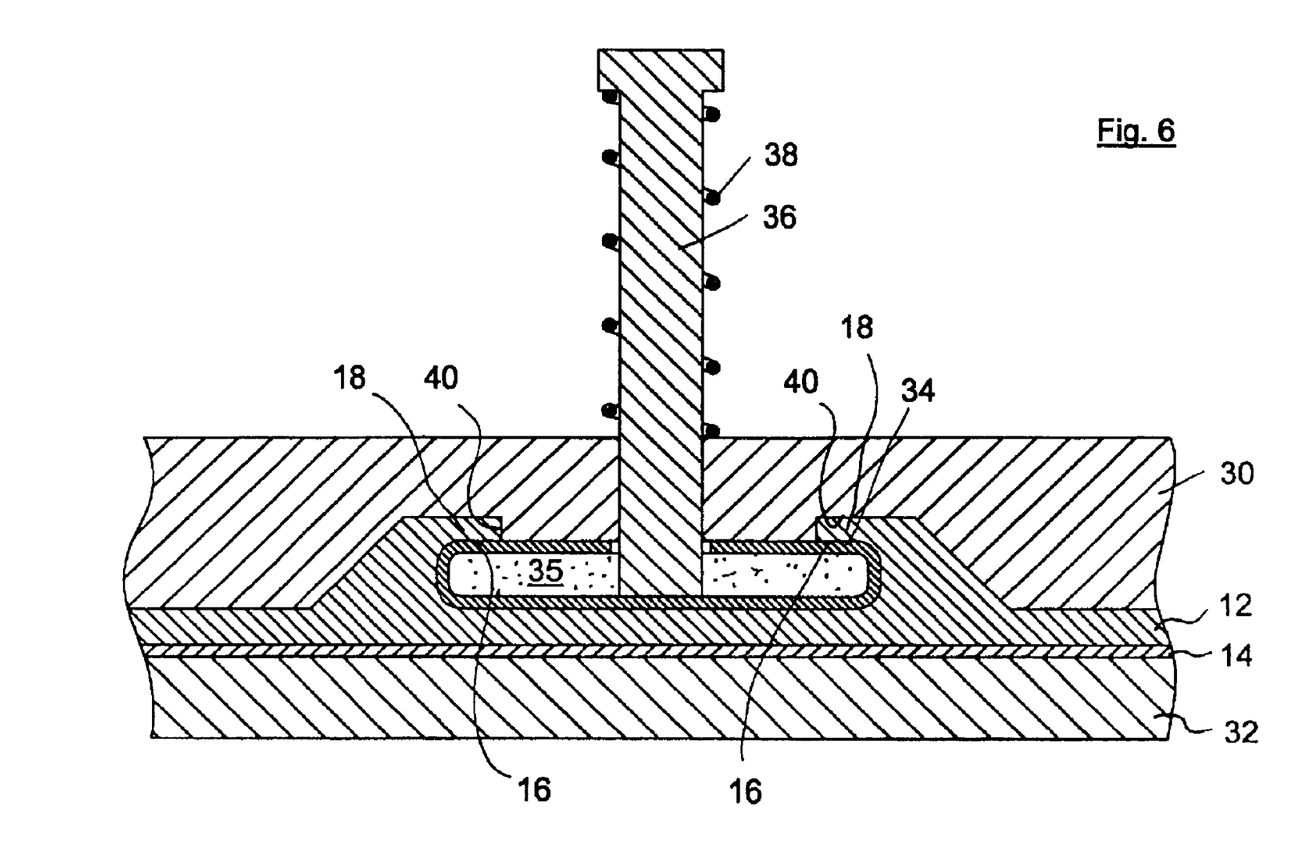
FIG. 6 shows the forming tool of FIG. 5 in the closed state, with the carrier layer being formed.

A further difference with respect to the forming tool described in FIGS. 5 to 7 consists in that in the present case the decorative layer 14 is arranged on the first tool part 30 and extends across the elastically deformable body 34. When the forming tool is in the closed state, the decorative layer 14 serves in the region of the elastically deformable body 34 for sealing at the second tool part 32.

After curing of the carrier layer 12, the decorative layer 14 is cut away in the region of the through-opening. The result of this process is a neat cut edge which is not soiled by material of the carrier layer 12. As can be seen in FIG. 10, the decorative layer 14 extends right through the undercuts 16, so that the resultant cut edges of cut may easily be concealed by a component inserted in the undercuts.

Figure 11:
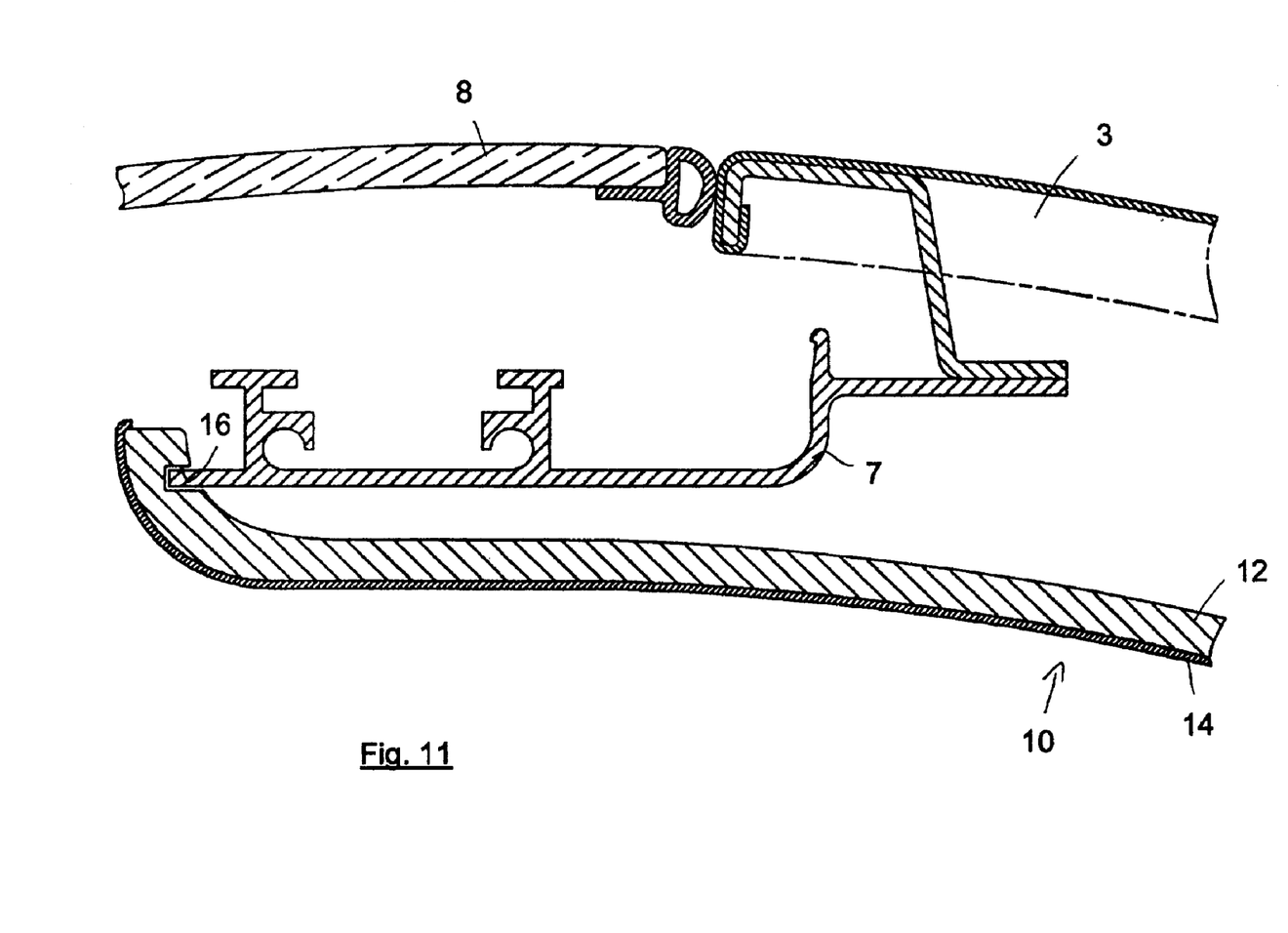
FIG. 11 shows an inner liner according to a third embodiment, in a view corresponding to that of FIG. 4.

In FIG. 11 there is shown an inner liner according to a third embodiment. Unlike the first and second embodiments, there is used only one single undercut 16, a web of the guide rail 7 being inserted into it. The undercut 16 of the third embodiment can be achieved in that the deformable body 34 projects beyond a shoulder 40 on a tool part only on one side.

The foregoing description is only exemplary of the principles of the invention. Many modifications and variations fo the present invention are possible in light of the above teachings. The preferred embodiments of the invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A roof component comprising:
   a carrier layer; and
   at least one undercut disposed in the carrier layer to form a mounting structure wherein said at least one undercut is a laterally-oriented groove having a first portion extending substantially perpendicular to and outwardly from a surface of the carrier layer and a second portion extending substantially parallel to the surface of the carrier layer.

2. The roof component according to claim 1, wherein said carrier layer has an opening and said groove extends around said opening.

3. The roof component according to claim 1, wherein said groove extends along a rim of said carrier layer.

4. The roof component according to claim 1, wherein said at least one undercuts comprises two parallel opposing undercuts that are spaced apart from each other.

5. The roof component according to claim 1, wherein a decorative layer extending across said at least one undercut is applied on said carrier layer.

6. The roof component according to claim 5, wherein said decorative layer has a cut edge that exposes a portion of said carrier layer adjacent to said at least one undercut.

7. The roof component according to claim 1, wherein said roof component is an inner liner.

8. A roof component for a vehicle, comprising:
   a carrier layer; and
   at least one undercut disposed in the carrier layer to form a mounting structure wherein said at least one is a laterally-oriented groove having a first portion extending substantially perpendicular to and outwardly from a surface of the carrier layer and a second portion extending substantially parallel to the surface of the carrier layer,
   wherein the second portion has a holding surface that is substantially parallel to the carrier layer.

* * * * *